(12) United States Patent
Good et al.

(10) Patent No.: US 6,240,095 B1
(45) Date of Patent: May 29, 2001

(54) BUFFER MEMORY WITH PARALLEL DATA AND TRANSFER INSTRUCTION BUFFERING

(75) Inventors: Christopher J. Good, West Bend; Lawrence E. Beine, Hartford, both of WI (US)

(73) Assignee: Genroco, Inc., Slinger, WI (US)

( * ) Notice: Subject to any disclaimer, the term of this patent is extended or adjusted under 35 U.S.C. 154(b) by 0 days.

(21) Appl. No.: 09/083,711

(22) Filed: May 22, 1998

Related U.S. Application Data

(60) Provisional application No. 60/085,424, filed on May 14, 1998.

(51) Int. Cl.⁷ .............................. H04L 12/28; H04L 12/56
(52) U.S. Cl. .............................................................. 370/412
(58) Field of Search .................................... 370/412, 382, 370/383, 392, 413, 415, 417, 419, 428, 440, 463, 465, 422, 421, 353, 356, 359, 360, 363, 368, 371, 378, 381, 396

(56) References Cited

U.S. PATENT DOCUMENTS

| | | | |
|---|---|---|---|
| 5,664,116 | * 9/1997 | Gaytan et al. | 709/234 |
| 5,909,546 | * 6/1999 | Osborne | 709/212 |
| 5,983,291 | * 11/1999 | Leger et al. | 710/52 |
| 5,991,304 | * 11/1999 | Abramson | 370/413 |
| 6,073,190 | * 6/2000 | Rooney | 710/56 |
| 6,078,733 | * 6/2000 | Osborne | 709/250 |

\* cited by examiner

*Primary Examiner*—Dang Ton
*Assistant Examiner*—Phirin Sam
(74) *Attorney, Agent, or Firm*—Quarles & Brady LLP

(57) ABSTRACT

A high speed buffer memory interface for connecting network and host devices provides dual paths of buffering where data travels via an input buffer or output buffer and instructions about the transfer of that data travel via a receive buffer and command buffer. The microprocessor reads instructions from the receive buffer placed there by the network interface circuitry and writes instructions to the command buffer to be read by the network interface circuitry without need to precisely synchronize with the input and network interface circuitry as would require time consuming, interrupt-type transactions.

7 Claims, 2 Drawing Sheets

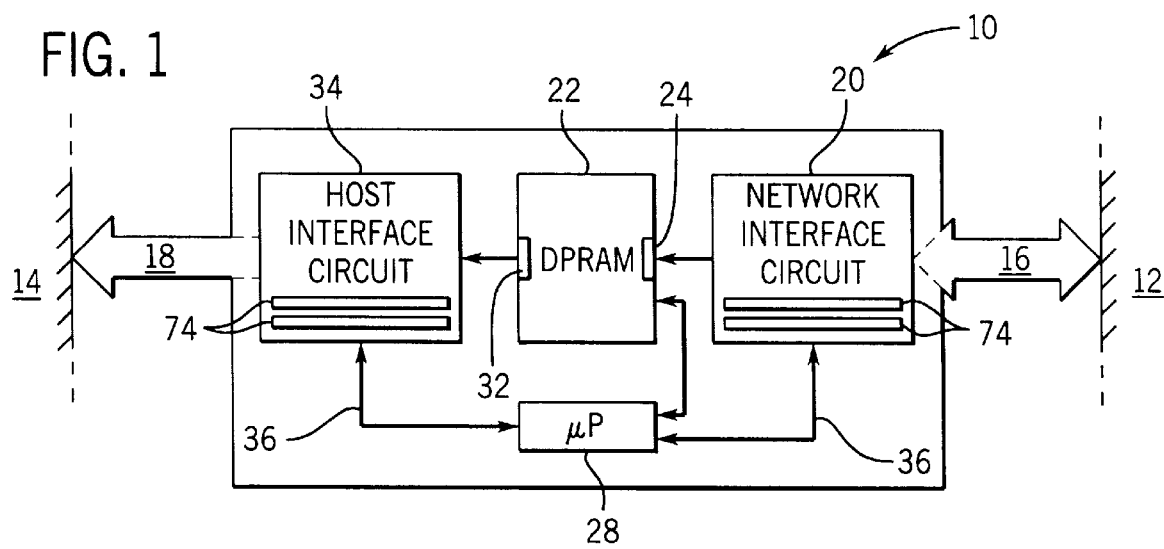
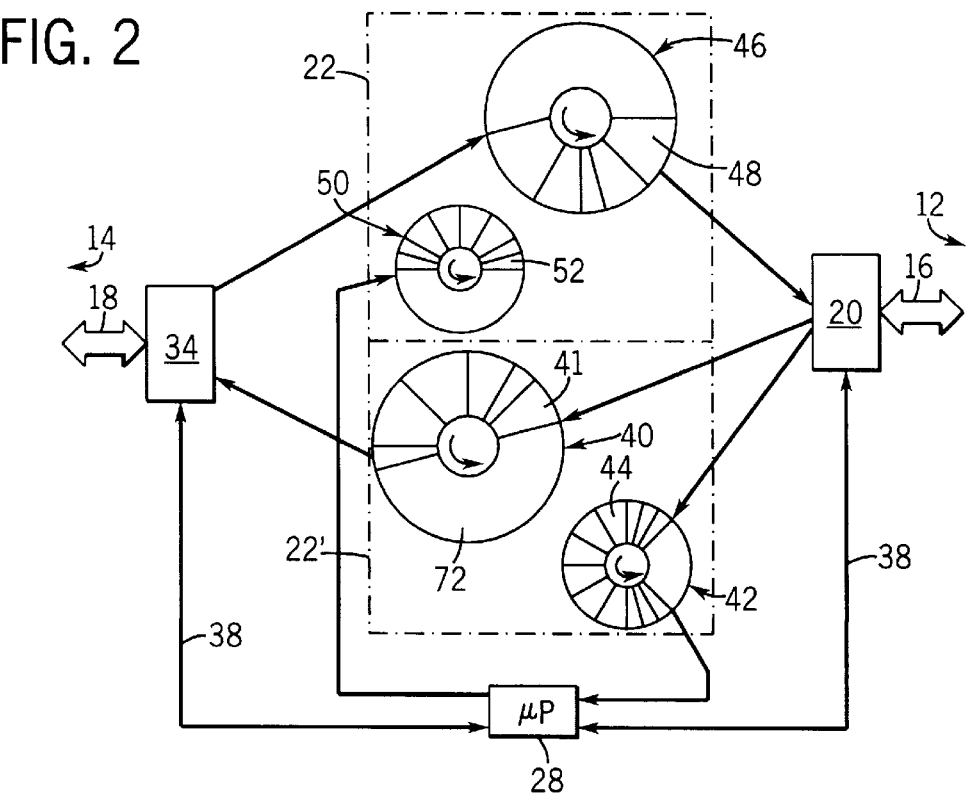

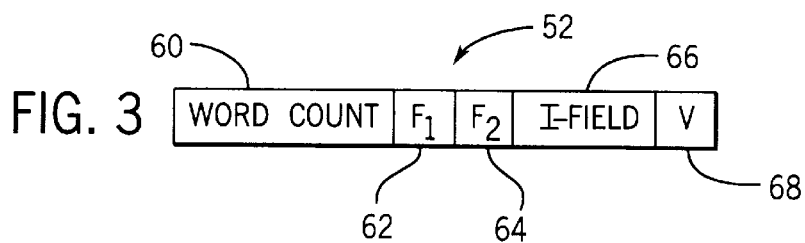
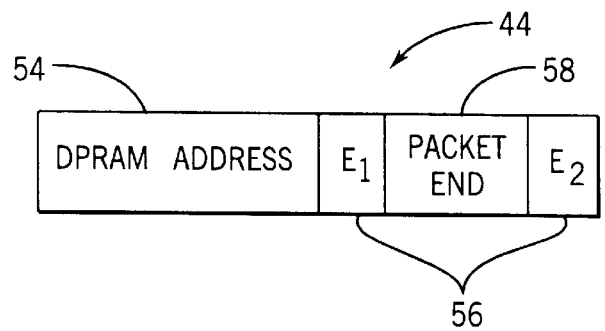
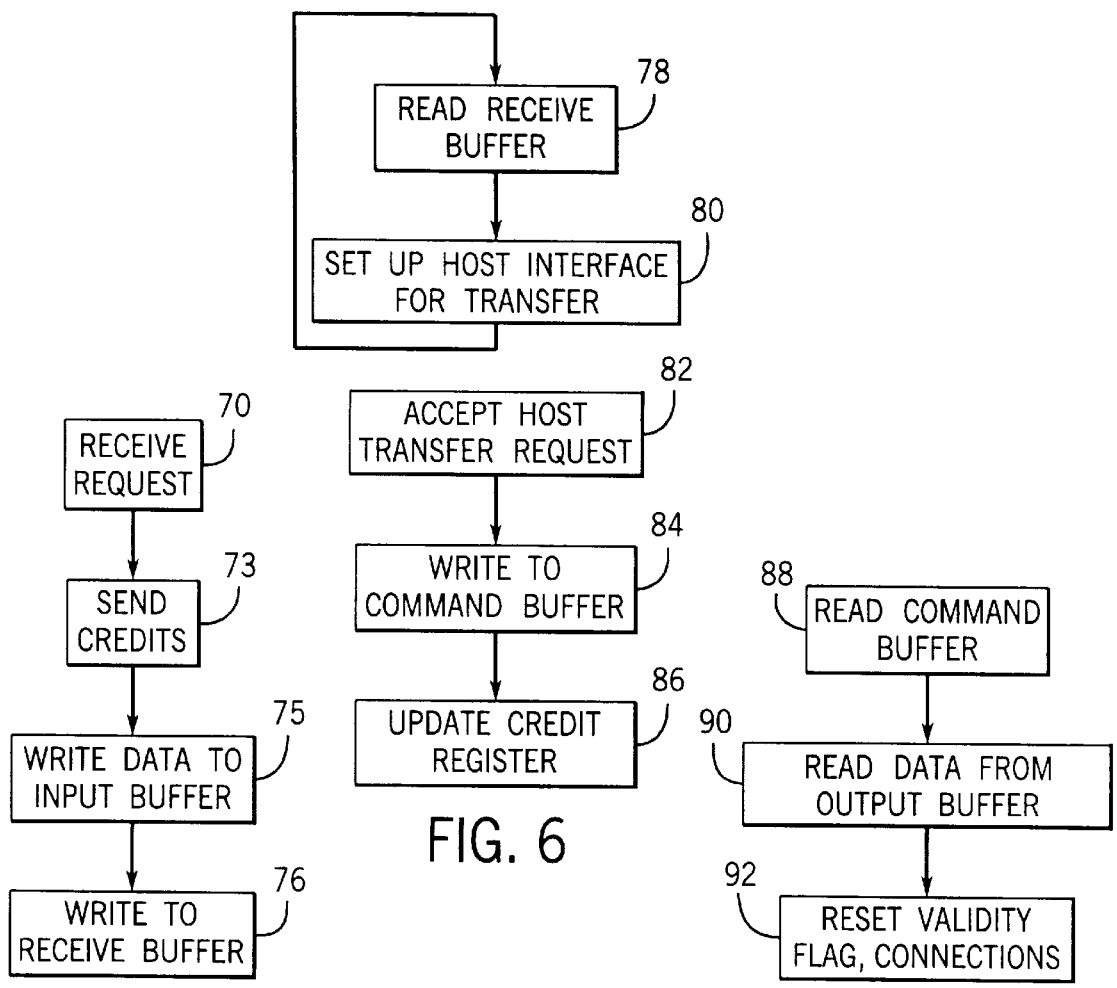

BUFFER MEMORY WITH PARALLEL DATA AND TRANSFER INSTRUCTION BUFFERING

CROSS-REFERENCE TO RELATED APPLICATIONS

This application is based on provisional application 60/085,424 filed May 14, 1998 and claims the benefit of that filing.

STATEMENT REGARDING FEDERALLY SPONSORED RESEARCH OR DEVELOPMENT

BACKGROUND OF THE INVENTION

In the communication of electronic signals over networks, for example the Internet, or between high speed computers, it is often necessary to provide a buffer memory interface that provides short term storage of data being received prior to transmission of that data. The storage may be necessary to accommodate different communication protocols for the received and transmitted data, such as may include an underlying difference in data transmission rate, or may simply result from the asynchronous operation of the interconnected network and host devices.

Such buffer memory interfaces present a bottleneck to the rapid transfer of data so there is considerable interest in speeding the progress of data through the buffer memory.

In this regard, it is known to make use of a dual port random access memory (DPRAM) that permits simultaneous writing to and reading from the buffer memory of the interface as opposed to a sharing of a single set of data and address lines per conventional computer memory.

A buffer memory interface using a DPRAM may include two specialized interface circuits operating under the control of a dedicated microprocessor. The interface circuits handle the low-level protocols of communicating with the network and host devices joined by the buffer memory interface.

Many sophisticated high speed data transmission protocols transmit data in packets each containing a header identifying the packet to a longer message. Packetization of the data allows resources along the network to be pre-allocated to provide space for the receipt of the data and allow the media along which the data is transmitted to be more easily shared or multiplexed between different messages and packets. The header information allows the packets to be reassembled even if they don't arrive continuously or even in order.

For the receipt of packet data from a network, using a buffer memory interface, the microprocessor causes the network interface circuit of the buffer memory interface to issue a credit to the network device for a small amount of data—typically less than a full packet. According to a pre-established protocol, the network device then sends a data burst to the buffer memory interface, the burst including the header for a packet. This header is read by the microprocessor to determine the size of the packet and enough additional credits are issued to allow the entire packet to be received. The network interface circuit then handles the transfer of the data into the buffer memory for the number of credits issued after which time it interrupts the microprocessor. The microprocessor reads the word count collected by the interface circuit and moves a pointer in the DPRAM to be ready for the next packet. This process is repeated for each packet.

For the transmission of a packet of data from the host device to the network, the microprocessor first establishes a connection to the network device. It then calculates an address for the data on the network and sets a word count in a register of the network interface circuit. The network interface circuit then proceeds to transmit the data to the network device until the word count has been transmitted at which time it interrupts the microprocessor to set up a new transmission.

By using the microprocessor interrupt capabilities, the microprocessor coordinates its operation with the network and host interface circuits. Nevertheless the interrupt process is relatively inefficient requiring many machine cycles of the microprocessor during which time the data of the interrupted microprocessor task is saved and a new task for the interrupt is loaded. Importantly, as the present inventors have recognized, during the interrupt process the host or network interface circuits remain idle awaiting instructions from the microprocessor.

However, the use of a microprocessor provides great flexibility in the operation of the buffer memory interface, allowing it to be reprogrammed for use in different situations. In contrast, the interface circuits are usually realized as programmable array logic (PALs) providing for high speed operation, but limited reprogramming capability.

BRIEF SUMMARY OF THE INVENTION

The present invention provides a buffer memory interface having two levels of buffering, the first for the data being transmitted, as is conventional, and the second for instructions relevant to the interface circuits such as are exchanged with the microprocessor.

Generally, the network interface circuit handles the preliminary steps of receiving data by issuing as many credits as there is buffer memory available to the network device. Instructions to the microprocessor about the data subsequently received are placed in a receive buffer for later access by the microprocessor. Conversely, the microprocessor provides instructions to the network interface circuit via a command buffer. The network interface circuit reads the command buffer when it has concluded each transfer without interrupting the microprocessor.

As a result, the microprocessor may operate wholly asynchronously with the network interface circuitry, reading the receive buffer to determine if additional data has been received without being interrupted, and writing commands to the command buffer as necessary without the need for network interface circuit to interrupt it to indicate that it is ready for more data. The flexibility of a microprocessor-based interface is retained, yet the time consuming interrupt process used to synchronize the various portions of the interface is eliminated. There is very little idle time imposed on the network interface circuit.

Specifically, the buffer memory interface circuit may include an input buffer memory and a receive buffer memory. In this case a network interface circuit receives data from the network device according to an input transmission protocol and writes the data to the input buffer memory and writes instructions to the receive buffer memory related to the received data. The microprocessor reads instructions from the receive buffer and in response to those instructions causes a host interface circuit to read data from the input buffer memory for transmission to the host device according to a host transmission protocol.

Thus it is one object of the invention to allow more independence in the operation of the microprocessor and the network interface circuit thereby eliminating the need for interrupt-type linkage. The network interface circuit may be kept fully utilized by allowing it to work ahead of the microprocessor placing instructions to the microprocessor in the receive buffer memory. By allowing the network interface circuit and microprocessor more freedom to work independently, the network interface circuit may be operated essentially continuously so long as the microprocessor is able to keep up in its transfer of the data out of the input buffer memory. Idling of the network interface circuit during an interrupt process is wholly eliminated.

Alternatively or in addition, the microprocessor may write data received from the host device in an input transmission protocol to the output buffer memory and write transmission instructions to the command buffer memory related to the data. The network interface circuit may read the instructions from the command buffer and in response to those instructions, read data from the output buffer and transmits that data to the network device according to a host transmission protocol.

Thus it is another object of the invention to provide the same benefits as those described above with respect to the transmission of data from the host to the network. Should the command buffer memory be filled, the microprocessor may momentarily halt operation without slowing the data being transmitted by the network interface circuit. This is in contrast to the prior art in which the network interface circuit was required to wait during an interrupt operation for the microprocessor to provide it with more commands.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 1 is a block diagram of the principal components of a buffer memory interface of the present invention providing a communication path between a host and network device and employing a dual port random access memory (DPRAM) buffering data between a host interface circuit and a network interface circuit under the control of a microprocessor;

FIG. 2 is a schematic representation of the multiple buffer memories implemented by the DPRAM of FIG. 1 showing the transmission of data through input and output buffers and the transmission of transfer commands through the receive and command buffers;

FIG. 3 is a graphical representation of one entry in the command buffer of FIG. 2;

FIG. 4 is a graphical representation of one entry in the receive buffer of FIG. 4;

FIG. 5 is a flowchart showing the operation of the network interface circuit of FIG. 1 in receiving data;

FIG. 6 is a flow chart showing the operation of the microprocessor of FIGS. 1 and 2 in mediating data transfer through the buffer memory interface asynchronously with the network interface circuit; and FIG. 7 is a flowchart showing the operation of the network interface circuit of FIG. 1 in transmitting data.

DETAILED DESCRIPTION OF THE INVENTION

Referring now to FIG. 1, the buffer memory interface 10 of the present invention is interposed between a network device 12 such as a remote server and a host device 14 such as a local computer on the network. Generally, the network device 12 communicates network data 16 having a network data protocol describing baud rates, formats of packet headers, packet sizes, parity and other parameters well-known in the art. The buffer memory interface 10 transfers previously received network data 16 as host data 18 having a host data protocol and format possibly differing from that of the network data 16.

Low level communication tasks with regard to the network data 16 are handled by a network interface circuit 20 electrically connected to media over which the network data 16 is communicated and in turn connected via a first port 24 to a DPRAM 22 into which data may be stored. The network interface circuit 20 is implemented in programmable array logic configured according to techniques well known in the art according to the requirements of the protocol of the network data 16.

The first port 24 of the DPRAM 22 also communicates with a microprocessor 28 which may read data from DPRAM 22.

A host interface circuit 34 communicates with a second port 32 of DPRAM 22 and may store data therein as transmitted from the host device 14. The host interface circuit 34 handles the low level communication requirements for transmitting the host data 18 to the DPRAM 22 from the host device 14. Network interface circuit 20 and host interface circuit 34 include one or more registers 74 that may be written to or read by the microprocessor 28 to store word counts, credits, and error status conditions as will be described.

The microprocessor 28 communicates with each of the network interface circuit 20 and host interface circuit 34 by a command bus 36 (including interrupt lines through which the microprocessor 28 may be interrupted). As will be described further below, such interrupts do not occur as a regular part of transmission of data to the network but are used to indicate error conditions.

Referring now to FIGS. 1 and 2, DPRAM 22 is divided into two sections and each half divided into two unequal portions. A first section of DPRAM 22 provides an input buffer 40 which in the preferred embodiment provides fifty-six kilobytes of data buffering. The input buffer 40 is divided into 56,000 entries 41. This section of DPRAM 22 provides a "receive buffer" 42 occupying 512 bytes and divided into 128 thirty-two bit entries 44.

The second section of DPRAM 22 is also divided into unequal portions to provide an output buffer 46 having 48,000 entries 48 and a "command buffer" 50 comprising 256 bytes divided into sixty-four, thirty-two-bit entries 52.

As is understood in the art, a buffer memory differs from a conventional random access memory in that it is associated with a pointer structure allowing it to be filled and empty in a predetermined order. Buffers 40, 42, 46 and 50 are first in, first out (FIFO) buffers and are arranged in a ring structure so that data is removed from and written to the buffer in a continuous sequence of arbitrary length.

Referring now to FIGS. 2 and 3, each entry 44 of the receive buffer 42 is associated with a group of addresses in the input buffer 40 holding a burst of network data 16 from the network device 12. The entry 44 provides a fifteen-bit address field such as can be used to store a last address 54 of the input buffer 40 where the burst is located. The last address 54 is followed by error flags 56 which are set if there are errors in the network data 16 detected by the network interface circuit 20 such as may be a parity or a length/ longitude redundancy check (LLRC) word error required of certain protocols as is understood in the art. A packet end flag 58 indicates that the burst of data of the entry 44 concludes a packet.

Correspondingly, each entry 52 of the command buffer 50 is associated with a group of addresses in the output buffer 46 holding data to be transmitted to the network device 12. The entries 52 hold a twelve-bit word count 60 indicating the total number of words associated with the associated data in the output buffer 46. A first flag 62 may be set to one to indicate that a connection should be retained to the network device 12 at the conclusion of the transmission of the data associated with the entry 52. A second flag 64 indicates that the packet associated with the data related to entry 52 has not concluded with the transmission of that data. An I-field flag 66 indicates that the data of the output buffer 46 represents an address of the network device 12. Finally a validity flag 68, when set, indicates that the transfer instructions represented by the entry 52 have not yet been executed and is reset by the network interface circuit 20 after execution.

Referring now to FIGS. 2 and 5, the operation of the present invention may begin with the receipt of network data 16 via network interface circuit 20 as indicated by process block 70. The network data 16 is preceded by a "request" from the network device 12 which is responded to by the network interface circuit 20 which send to the network device 12, a number of "credits" equal an amount to the unused portion 72 of the input buffer 40. This sending of credits is indicated by process block 73. The size of the unused portion 72 of the input buffer 40 is stored in a credit register 74, part of the network interface circuit 20. The operation and character of requests and credits is well known in the art and defined in certain communication protocols.

The network device 12 will then transmit in a "burst" data that will be received by the network interface circuit 20 and written sequentially to entries 41 of input buffer 40 as indicated by process block 75. At the conclusion of this burst which does not necessarily conclude a data packet, the network interface circuit 20 will write transfer instructions to the receive buffer 42, an entry 44 as shown in FIG. 4, including the current DPRAM address 54 being a last physical address in input buffer 40 where data of the burst is stored. Any error flags 56 and an indication of whether the packet was concluded with that data burst are also stored in this entry 44 as previously described. The network interface circuit 20 will then wait for an additional receive request at process block 70.

As shown in FIG. 6, and referring also to FIG. 2, the microprocessor 28 operating asynchronously with the network interface circuit 20 reads the receive buffer 42 according to a pre-determined order to find the next valid entry 44. This is indicated by process block 78 of FIG. 6. The microprocessor then communicates with the host interface circuit 34 to initiate the transfer of this data, as bounded by the DPRAM final address 54 (shown in FIG. 4), sequentially from the input buffer 40 to the host device 14 as indicated by process block 80. This read data is transferred autonomously by the host interface circuit 34 according to prior art techniques..

When data is to be transmitted from the host device 14 to the network device 12, the microprocessor 28, is interrupted by the host interface circuit 34 (per process block 82) and writes transfer instructions for this data to the command buffer 50, as indicated by process block 84. In particular, the microprocessor 28 writes the word count 60 (as shown in FIG. 3) of the data associated with the burst as well as flags 62 and 64 indicating whether the packet is complete and similarly whether the connection to the network device 12 should remain open. The microprocessor 28 computes an internal address for the data needed by the network device 12 and may place this in an appropriate position within the buffer 46 identified by an entry 52 by the I-field flag 66. The validity flag 68 of the entry 52 is then set by the microprocessor as a signal to the network interface circuit 20 as will be described below. Finally, as indicated by process block 86, the microprocessor updates the credit register 74 of the network interface circuit 20 according to how much the input buffer 40 has been cleared during the transfer to the output buffer 46.

Referring now to FIG. 7, the network interface circuit 20 may read the command buffer 50 as indicated by process block 88 to see if any entries 52 are valid as indicated by their validity bits 68. This operation is asynchronous to the operation of the microprocessor 28. If an entry exists in the command buffer 50, then at process block 90 the network interface circuit 20 reads data from the output buffer 46 and transmits it with the appropriate low level protocol as network data 16 to the network device 12. The amount of data is controlled by the word count 60 and the address of the data is according to the I-field data indicated by I field flag 66.

At the conclusion of this transmission as indicated by process block 92, the network interface circuit 20 resets the validity flag 68 (shown in FIG. 3) and if necessary closes the connection and concludes the packet with the network device 12 according to flags 62 and 64.

Thus the two components of the network interface circuit 20 and the microprocessor 28 are free to operate essentially asynchronously so that the network interface circuit 20 is not slowed by a time-consuming interrupt transaction with the microprocessor 28.

In the event of an error in the data, for example, as indicated by the error flags 56 shown in FIG. 4, the microprocessor 28 may directly communicate with either the network interface circuit 20 or the host interface circuit 34 via bus 36 shown in FIG. 1 to request a transmission or to signal the operator or perform other exception handling routines. In this case, the interrupt transaction is not avoided; however, such occurrences are atypical in the transmission of the data.

Many other modifications and variations of the preferred embodiment will still be within the spirit and scope of the invention as will be apparent to those of ordinary skill in the art. For example, the size of the various input, output, command and receive buffers may be varied according to the anticipated need for the buffer memory interface 10. It will also be understood that additional data forming essential communication between the microprocessor 28 and the network interface circuit 20 or network interface circuit 20 may be incorporated into the entries of the command and receive buffers as have been described. In order to apprise the public of the various embodiments that may fall within the scope of the invention, the following claims are made.

What is claimed is:

1. A buffer memory interface circuit communicating data between a network device and a host device, the buffer memory interface circuit comprising:
    an output buffer memory;
    a command buffer memory;
    a host interface circuit writing data received from the host device in a first transmission protocol to the output buffer memory;

a microprocessor controlling the host interface circuit and writing transmission instructions to the command buffer memory related to the data; and a network interface circuit reading the transmission instructions from the command buffer memory and in response to those transmission instructions reading the data from the output buffer memory and transmitting the data to the network device according to a network transmission protocol;

wherein the transmission instructions are selected from the group consisting of word count of the data, whether a connection according to the network transmission protocol with the network device should be maintained after conclusion of the transmission of the data; whether an address of a destination of the data at the network device should be maintained after the conclusion of the transmission of the data, the address of the data at the network device, and a flag indicating whether the transmission instructions have been executed by the network interface circuit.

2. The buffer memory interface circuit of claim 1 wherein the output buffer memory is a dual port random access memory.

3. The buffer memory interface circuit of claim 1, further comprising:

an input buffer memory; and a receive buffer memory.

4. The buffer memory interface circuit of claim 3, wherein:

the network interface circuit receives additional data from the network device according to the network transmission protocol and writes the additional data to the input buffer memory and writes secondary instructions to the receive buffer memory related to the received additional data;

the host interface circuit communicates with the host device; and the microprocessor reads the secondary instructions from the receive buffer memory and in response to those secondary instructions controls the host interface circuit to read the additional data from the input buffer memory for transmission to the host device according to the first transmission protocol.

5. The buffer memory interface circuit of claim 4 wherein the input buffer memory is a dual port random access memory.

6. The buffer memory interface circuit of claim 4, wherein the secondary instructions are selected from the group consisting of location of the additional data in the input buffer memory, end of a packet of the additional data from the network device, and error in the additional data.

7. The buffer memory interface circuit of claim 1, wherein the microprocessor causes the host interface to write data from the host device in the first transmission protocol to the output buffer memory in response to a request by the host device.

* * * * *